United States Patent
Hoang et al.

(10) Patent No.: US 11,258,649 B2
(45) Date of Patent: Feb. 22, 2022

(54) TRANSMITTER AND RECEIVER COMMUNICATION APPARATUS FOR NON-COHERENT COMMUNICATION

(71) Applicant: HUAWEI TECHNOLOGIES CO., LTD., Guangdong (CN)

(72) Inventors: Ngo Khac Hoang, Munich (DE); Alexis Decurninge, Boulogne Billancourt (FR); Maxime Guillaud, Boulogne Billancourt (FR); Sheng Yang, Gif-sur-Yvette (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/243,679

(22) Filed: Apr. 29, 2021

(65) Prior Publication Data
US 2021/0258202 A1     Aug. 19, 2021

Related U.S. Application Data

(63) Continuation of application No. PCT/EP2018/079673, filed on Oct. 30, 2018.

(51) Int. Cl.
*H04L 27/04* (2006.01)
*H04L 27/34* (2006.01)
*H04L 27/18* (2006.01)

(52) U.S. Cl.
CPC .......... *H04L 27/3483* (2013.01); *H04L 27/04* (2013.01); *H04L 27/18* (2013.01); *H04L 27/3422* (2013.01)

(58) Field of Classification Search
CPC . H04B 7/0413; H04B 10/5055; H04L 5/0023; H04L 5/023; H04L 1/0054;
(Continued)

(56) References Cited

U.S. PATENT DOCUMENTS

| | | | |
|---|---|---|---|
| 2012/0183020 A1 | 7/2012 | Koike-Akino et al. | |
| 2016/0006515 A1 | 1/2016 | Kojima et al. | |
| 2017/0126360 A1* | 5/2017 | Millar | H04L 1/0045 |

FOREIGN PATENT DOCUMENTS

| | | |
|---|---|---|
| CN | 101848071 A | 9/2010 |
| CN | 102571674 A | 7/2012 |
| CN | 107431566 A | 12/2017 |

OTHER PUBLICATIONS

Kareem M. Attiah et al., "Hierarchical coherent and non-coherent communication", 2017 51st Asilomar Conference on Signals, Systems, and Computers, Oct. 29-Nov. 1, 2017, 6 pages.
(Continued)

*Primary Examiner* — Rahel Guarino (57) ABSTRACT

The disclosure relates to a transmitting communication apparatus and a receiving communication apparatus of a non-coherent communication system. The transmitting communication apparatus is configured to communicate with the receiving communication apparatus via a communication channel. The transmitting communication apparatus comprises a processing circuitry configured to: map a sequence of data bits into a modulation symbol of a plurality of modulation symbols defined by a modulation constellation, wherein the modulation constellation is defined by a tiling of a Grassmannian manifold into a plurality of cells and a Cartesian product of a plurality of auxiliary constellations, wherein the Cartesian product of the plurality of auxiliary constellations is mapped onto each cell of the plurality of cells and each auxiliary constellation defines a plurality of auxiliary symbols. The processing circuitry is further configured to transmit a modulated signal based on the modulation symbol via the communication channel to the receiving communication apparatus.

20 Claims, 8 Drawing Sheets

(58) Field of Classification Search
CPC . H04L 27/3483; H04L 27/3422; H04L 27/04; H04L 27/18
See application file for complete search history.

(56) References Cited

OTHER PUBLICATIONS

Suayb S. Arslan et al., "Coded Hierarchical Modulation for Wireless Progressive Image Transmission", IEEE Transactions on Vehicular Technology, vol. 60, No. 9, Nov. 2011, 15 pages.
Dola Saha et al., "GRaTIS: Free Bits in the Network", IEEE Transactions on Mobile Computing, vol. 14, No. 1, Jan. 2015, 14 pages.
Mohammad T. Hussien et al., "Space-Time Block Codes over the Stiefel Manifold", 2015 IEEE Global Communications Conference (GLOBECOM), Dec. 6-10, 2015, 7 pages.
Hamidreza Khakzad et al., "Multiuser Scheduling on Downlink Communications by Using Adaptive Hierarchical Modulation", 2015 IEEE International Conference on Communications (ICC), Jun. 8-12, 2015, 7 pages.
Karim G. Seddik et al., "Multi-Resolution Multicasting Over the Grassmann and Stiefel Manifolds", IEEE Transactions on Wireless Communications, vol. 16, No. 8, Aug. 2017, 15 pages.
International Search Report and Written Opinion issued in PCT/EP2018/079673, dated Aug. 26, 2019, 29 pages.
Office Action issued in CN201880096620.6 dated Sep. 2, 2021, 7 pages.

* cited by examiner

TRANSMITTER AND RECEIVER COMMUNICATION APPARATUS FOR NON-COHERENT COMMUNICATION

CROSS-REFERENCE TO RELATED APPLICATIONS

This application is a continuation of International Application No. PCT/EP2018/079673, filed on Oct. 30, 2018, the disclosure of which is hereby incorporated by reference in its entirety.

TECHNICAL FIELD

Generally, the present disclosure relates to the field of telecommunications. More specifically, the present disclosure relates to a transmitter and a receiver implementing a structured modulation scheme with low-complexity de-mapping for non-coherent communication.

BACKGROUND

Coherent communication schemes make use of information about the communication channel between a transmitter and a receiver that is generally obtained through pilot sequences exchanged between the transmitter and the receiver. These pilot sequences consume spectral resources of the transmitter and the receiver. Conventional non-coherent communication schemes, i.e. communication schemes aiming to transmit a sequence of bits from the transmitter to the receiver through a channel without the information about the communication channel gain, for instance, from pilot sequences, using an unstructured constellation, exhibit a high decoding complexity. Moreover, conventional non-coherent communication schemes based, for instance, on Differential Phase Shift Keying (DPSK) exhibit a low spectral efficiency (i.e., encode too few information bits per channel access).

Thus, there is a need for an improved transmitting communication apparatus and an improved receiving communication apparatus implementing a non-coherent communication scheme.

SUMMARY

It is an object of the disclosure to provide an improved transmitter (or referred to as "transmitting communication apparatus" in the present disclosure) and an improved receiver (or referred to as "receiving communication apparatus" in the present disclosure) implementing a non-coherent communication scheme.

The foregoing and other objects are achieved by the subject matter of the independent claims. Further example implementations are apparent from the dependent claims, the description and the figures.

According to a first aspect, the disclosure relates to a transmitting communication apparatus for communicating with a receiving communication apparatus via a communication channel. The transmitting communication apparatus comprises a processing circuitry configured to: map a sequence of data bits into a modulation symbol of a plurality of modulation symbols defined by a modulation constellation, wherein the modulation constellation is defined by a tiling of a manifold, for example a Grassmannian manifold, into a plurality of cells, i.e. T cells, and a Cartesian product of a plurality of auxiliary constellations, and wherein the Cartesian product of the plurality of auxiliary constellations is mapped onto each cell of the plurality of cells and wherein each auxiliary constellation defines a plurality of auxiliary symbols. The processing circuitry is further configured to transmit a modulated signal based on the modulation symbol via the communication channel to the receiving communication apparatus.

In a further example embodiment of the first aspect of the disclosure, the plurality of auxiliary constellations comprise a plurality of complex or real auxiliary constellations, for example a plurality of real pulse amplitude modulation (PAM) constellations, e.g. 2(T−1) PAM constellations.

In a further example embodiment of the first aspect of the disclosure, the processing circuitry is configured to map the sequence of data bits into the modulation symbol by associating the modulation symbol with the sequence of data bits in that a first portion of the sequence of data bits of size $\lceil \log(T) \rceil$ bits, i.e. the cell bits, identifies a respective cell of the plurality of cells in the tiling of the manifold, for example Grassmannian manifold, and a second portion of the sequence of data bits of size $\Sigma_{i=1}^{T-1}(B_i^r + B_i^c)$, identifies a position of the modulation symbol within the respective cell of the manifold, for example Grassmannian manifold, where $B_i^r$ and $B_i^c$ are the number of bits corresponding respectively to the binary representation of the real part and imaginary part of the complex coordinate i, i.e. the coordinate bits.

In a further example embodiment of the first aspect of the disclosure, the second portion of the sequence of data bits, i.e. the coordinate bits, identifies the position of the modulation symbol within the respective cell based on a respective Gray-code labeling of the respective plurality of auxiliary symbols of a respective cell in the tiling of the manifold, for example Grassmannian manifold.

In a further example embodiment of the first aspect of the disclosure, the processing circuitry is further configured to convert the first portion of the sequence of data bits, i.e. the cell bits, into an integer cell index $i_0$ in the range $[1, T]$ and to generate the modulation symbol of the modulation constellation as a normalized complex vector x corresponding to a complex vector z of dimension T, wherein the processing circuitry is configured to determine the complex vector z on the basis of the following equation:

$$z = \begin{bmatrix} g(c_1, d_1) \\ \vdots \\ g(c_{i_0-1}, d_{i_0-1}) \\ 1 \\ g(c_{i_0}, d_{i_0}) \\ \vdots \\ g(c_{T-1}, d_{T-1}) \end{bmatrix},$$

wherein T denotes the total number of cells in the tiling of the manifold, for example Grassmannian manifold, wherein $c_i, d_i$ denote a respective auxiliary symbol of a respective auxiliary constellation given by a respective real number in the range [0,1] associated with the second portion of the sequence of data bits, i.e. the coordinate bits, wherein the function g(c, d) is configured to distribute the modulation symbols over the manifold, for example Grassmannian manifold, in a substantially uniform manner.

In a further example embodiment of the first aspect of the disclosure, the function g(c,d) is defined by the following equation:

$$g(c,d) = \sqrt{\frac{1-\exp\left(-\frac{|w|^2}{2}\right)}{1+\exp\left(-\frac{|w|^2}{2}\right)}} \frac{w}{|w|},$$

with $w=N^{-1}(c)+iN^{-1}(d)$ and $N(\ )$ denoting the cumulative distribution function of the standard Gaussian distribution.

In a further example embodiment of the first aspect of the disclosure, the processing circuitry is further configured to encode additional information by mapping a further sequence of data bits into a further modulation symbol of the plurality of modulation symbols defined by the modulation constellation, wherein the additional information is encoded as a phase difference between a first component of the modulation symbol and a second component of the further modulation symbol.

In a further example embodiment of the first aspect of the disclosure, the processing circuitry is configured to map the further sequence of data bits into the further modulation symbol of the plurality of modulation symbols defined by the modulation constellation such that the following relation holds:

$$\frac{x_T}{|x_T|} = s\frac{x_1'}{|x_1'|}$$

wherein $x_T$ denotes the T-th component of the modulation symbol $x=(x_1,\ldots,x_T)$, $x'_1$ denotes the first component of the further modulation symbol $x'=(x'_1,\ldots,x'_T)$ and s denotes a complex scalar $s=e^{i\varphi}$ defining a phase relationship between the modulation symbol x and the further modulation symbol x'.

In a further example embodiment of the first aspect of the disclosure, the processing circuitry is configured to select the complex scalar s from a phase-shift keying (PSK) constellation.

In a further example embodiment of the first aspect of the disclosure, the processing circuitry is configured to select the complex scalar s from the set of complex symbols $e^{i\varphi_1},\ldots,e^{i\varphi_J}$ with phases $\varphi_1,\ldots,\varphi_J$ defined by J constellation points of a uniform grid in the interval $[0, 2\pi]$.

In a further example embodiment of the first aspect of the disclosure, the processing circuitry is further configured to map a further sequence of data bits into a further modulation symbol of the plurality of modulation symbols defined by the modulation constellation and to generate the modulated signal on the basis of a (2T−1)-dimensional vector defined as follows:

$$(x_1,\ldots,x_T,\alpha x_2',\ldots,\alpha x_T'),$$

wherein $x_1,\ldots,x_T$ denote T components of the modulation symbol $x=(x_1,\ldots,x_T)$, $x'_2,\ldots,x'_T$ denote (T−1) components of the modulation symbol $x'=(x'_1,\ldots,x'_T)$ and $\alpha$ denotes a scaling parameter defined as $$\alpha = \frac{x_T}{x_1'}.$$

In a further example embodiment of the first aspect of the disclosure, the transmitting communication apparatus is one of a group of transmitting communication apparatuses communicating with the receiving communication apparatus, wherein the processing circuitry of the transmitting communication apparatus is further configured to pre-code and normalize the modulation symbol and to generate the modulated signal on the basis of the pre-coded modulation symbol such that the pre-coded modulation symbol is uniquely attributable to the transmitting communication apparatus.

In a further example embodiment of the first aspect of the disclosure, the processing circuitry is configured to pre-code and normalize the modulation symbol using a precoding matrix $U_k$ of size T×(T−K+1) as $$\frac{U_k x}{\|U_k x\|},$$

with x denoting the modulation symbol, k denoting the k-th transmitting communication apparatus of the group of transmitting communication apparatuses and K denoting the size of the group of transmitting communication apparatuses.

In a further example embodiment of the first aspect of the disclosure, the precoding matrix $U_k$ is defined by the following equation:

$$U_k=(e_k,e_{K+1},\ldots,e_T).$$

wherein $e_k$ denotes a vector of size T with 1 at position k and 0 elsewhere.

In a further example embodiment of the first aspect of the disclosure, the precoding matrix $U_k$ is defined by the following equation:

$$U_k=(\sqrt{Q_1}e_k,\sqrt{Q_2}e_{K+1},\ldots,\sqrt{Q_2}e_T),$$

wherein $e_k$ denotes a vector of size T with 1 at position k and 0 elsewhere, wherein $$Q_1 = K\frac{T-K+1}{T} \text{ and } Q_2 = \frac{T-K+1}{T}.$$

In a further example embodiment of the first aspect of the disclosure, the precoding matrix $U_k$ is defined by the following equation:

$$U_k=(e_1,\ldots,e_{(k-1)(K-1)},e_{k(K-1)+1},\ldots,e_T),$$

wherein $e_k$ denotes a vector of size T with 1 at position k and 0 elsewhere.

In a further example embodiment of the first aspect of the disclosure, the precoding matrix $U'_k$ is defined by the following equation:

$$U_k=RU'_k,$$

wherein $U'_k$ denotes the precoding matrix of any one of the preceding implementation forms and R denotes a rotation matrix independent from k.

According to a second aspect, the disclosure relates to a corresponding receiving communication apparatus for communicating with the transmitting communication apparatus according to the first aspect. The receiving communication apparatus comprises a processing circuitry configured to: receive a modulated signal from the transmitting communication apparatus via the communication channel, wherein the modulated signal is based on a mapping of a sequence of data bits into a modulation symbol of a plurality of modulation symbols defined by a modulation constellation, wherein the modulation constellation is defined by a tiling of a manifold, for example Grassmannian manifold, into a plurality of cells, i.e. T cells, and a Cartesian product of a plurality of auxiliary constellations, wherein the Cartesian product of the plurality of auxiliary constellations is mapped onto each cell of the plurality of cells and wherein each auxiliary constellation defines a plurality of auxiliary symbols; and generating on the basis of the modulated signal the sequence of data bits.

In a further example embodiment of the second aspect of the disclosure, the received modulated signal is represented by a matrix Y, wherein the processing circuitry comprises a hard decoder configured to generate the sequence of data bits by: determining a vector u defined by the matrix Y with $\|u\|^2=1$ maximizing $\|Y^H u\|^2$; determining an index i of a cell of the plurality of cells of the manifold, for example Grassmannian manifold, such that $|u_i| \geq |u_j|$ for any j, wherein $u_i$ denotes the i-th component of the vector u; applying the mapping defined by the following equation:

$$\begin{bmatrix} \hat{c}_1 \\ \hat{d}_1 \\ \vdots \\ \hat{d}_{i-1} \\ \hat{c}_i \\ \vdots \\ \hat{c}_{T-1} \\ \hat{d}_{T-1} \end{bmatrix} = \begin{bmatrix} N\left(\text{Re}\left(\sqrt{2}\log\left(\frac{1+|u_1/u_i|^2}{1-|u_1/u_i|^2}\right)^{1/2} \frac{u_1/u_i}{|u_1/u_i|}\right)\right) \\ N\left(\text{Im}\left(\sqrt{2}\log\left(\frac{1+|u_1/u_i|^2}{1-|u_1/u_i|^2}\right)^{1/2} \frac{u_1/u_i}{|u_1/u_i|}\right)\right) \\ \vdots \\ N\left(\text{Im}\left(\sqrt{2}\log\left(\frac{1+|u_{i-1}/u_i|^2}{1-|u_{i-1}/u_i|^2}\right)^{1/2} \frac{u_{i-1}/u_i}{|u_{i-1}/u_i|}\right)\right) \\ N\left(\text{Re}\left(\sqrt{2}\log\left(\frac{1+|u_{i+1}/u_i|^2}{1-|u_{i+1}/u_i|^2}\right)^{1/2} \frac{u_{i+1}/u_i}{|u_{i+1}/u_i|}\right)\right) \\ \vdots \\ N\left(\text{Re}\left(\sqrt{2}\log\left(\frac{1+|u_T/u_i|^2}{1-|u_T/u_i|^2}\right)^{1/2} \frac{u_T/u_i}{|u_T/u_i|}\right)\right) \\ N\left(\text{Im}\left(\sqrt{2}\log\left(\frac{1+|u_T/u_i|^2}{1-|u_T/u_i|^2}\right)^{1/2} \frac{u_T/u_i}{|u_T/u_i|}\right)\right) \end{bmatrix},$$

with N( ) denoting the cumulative distribution function of the standard Gaussian distribution; for each $\hat{c}_i, \hat{d}_i$, determining the closest symbol within the auxiliary constellations; determining respective coordinate bits corresponding to the respective closest symbol within the auxiliary constellations; and determining cell bits corresponding to the binary representation of index i.

In a further example embodiment of the second aspect of the disclosure, the processing circuitry further comprises a soft decoder configured to generate the sequence of data bits on the basis of a plurality of log-likelihood ratios (LLRs), wherein the processing circuitry is configured to determine the plurality of LLRs on the basis of the following equation:

$$LLR_i(Y) \approx \frac{snr \cdot T}{1 + snr \cdot T}\left(\max_{x \in R_{i,1}(x^*)} \|Y^H x\|^2 - \max_{x \in R_{i,1}(x^*)} \|Y^H x\|^2\right),$$

wherein snr denotes the signal-to-noise ratio equal to $$\frac{P\sigma_h^2}{\sigma_W^2}$$

where $\sigma_h^2$ and $\sigma_W^2$ respectively denote the average variance of the components of h and W, T denotes a length of a respective modulation symbol, x* denotes the symbol of the matrix Y determined by the hard decoder, $R_{i,0}(x)$ and $R_{i,1}(x)$ denote respective sets of the plurality of modulation symbols of the modulation constellation, whose respective bit at position i in the second portion of the sequence of data bits is equal to 0 and 1, respectively.

In a further example embodiment of the second aspect of the disclosure, $R_{i,0}(x)$ and $R_{i,1}(x)$ denote respective sets of the plurality of modulation symbols of the modulation constellation, which are located in the vicinity of, for example closest to the modulation symbol x, and whose respective bit at position i in the second portion of the sequence of data bits is equal to 0 and 1, respectively.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized, and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method operation is described, a corresponding device may include a unit to perform the described method operation, even if such unit is not explicitly described or illustrated in the figures. Further, it is understood that the features of the various exemplary aspects described herein may be combined with each other, unless specifically noted otherwise.

Figure 1:
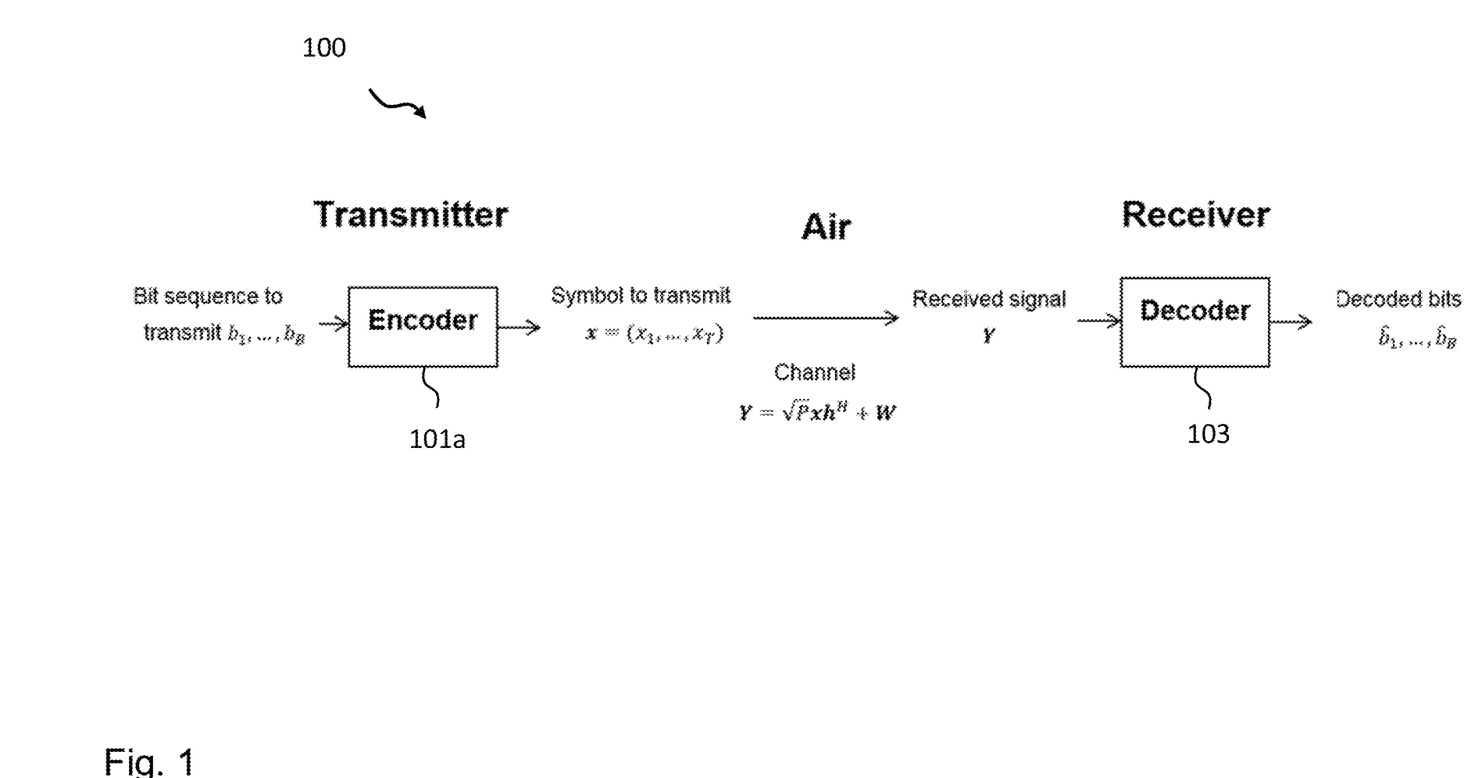
FIG. 1 shows a schematic diagram illustrating a non-coherent communication system comprising a transmitter and a receiver according to an embodiment.

FIG. 1 shows a non-coherent communication system 100 comprising a transmitter (also referred to as encoder) 101a according to an embodiment and a receiver (also referred to as decoder) 103 according to an embodiment. As illustrated in FIG. 1, the transmitter 101a is configured to communicate with the receiver 103 via a communication channel, which could be a wireless or wired communication channel. In the embodiment shown in FIG. 1, the transmitter 101a can have a single antenna and the receiver 103 can have M antennas.

The transmitter 101a comprises a processing circuitry configured to map a sequence of data bits to be transmitted to the receiver 103 into a modulation symbol x of a plurality of modulation symbols defined by a modulation constellation, as illustrated in FIG. 1. Moreover, the processing circuitry of the transmitter 101a is configured to transmit a modulated signal based on the modulation symbol x via the communication channel to the receiver 103 using, for instance, its antenna.

As will be appreciated, generally a "constellation" or "modulation constellation" is a set of possible modulation symbols. Which modulation symbol (among those in the constellation) actually ends up being transmitted is determined by the data bits that the transmitter 101a wants to transmit. The receiver 103 tries to "recognize" the modulation symbol in order to recover, i.e. decode the corresponding data bits.

In the exemplary embodiment shown in FIG. 1, a non-coherent symbol can be encoded by the transmitter 101a over T channel uses (for instance, mapped in the time-frequency grid of an OFDM modulation or mapped in time for a wideband modulation), during which the channel is assumed to remain constant. In that case, as illustrated in FIG. 1, for each symbol x sent by the transmitter 101a the receiver 103 receives:

$$Y = \sqrt{P} x h^H + W,$$

where $x = (x_1, \ldots, x_T)$ is a vector of size T representing the transmitted symbol, $\sqrt{P}$ is the power gain with which the symbol has been sent by the transmitter 101a, h is a vector of size M representing the channel between the antenna of the transmitter 101a and the M antennas of the receiver apparatus 103, W is a matrix of size T×M representing the thermal noise, and Y is a matrix of size T×M representing the symbols received at the receiver 103. As will be appreciated, in case according to an embodiment, the receiver 103 has only a single antenna, i.e. M=1, the matrix Y becomes a vector (often denoted as y).

As already mentioned above, the principle of non-coherent communication or a non-coherent modulation scheme is that both encoder and decoder do not know the channel realization h. Therefore, the decoder will not be able to distinguish between the symbols x and gx for any complex gain g. One conventional approach to solve this ambiguity is to split the symbol x into a pilot part and a data part. As already mentioned above, this is the classical pilot-based approach used in coherent communication systems, where the receiver makes use of the (known) pilot part to estimate the channel state. Another approach adopted by embodiments of the disclosure is to take into account this ambiguity by designing the modulation constellation (i.e., the set of T-dimensional modulation symbols) such that the ambiguity does not cause any loss in information. This can be achieved by designing the symbols in a Grassmannian space or manifold (in which x and gx are not considered distinct).

Figure 2:
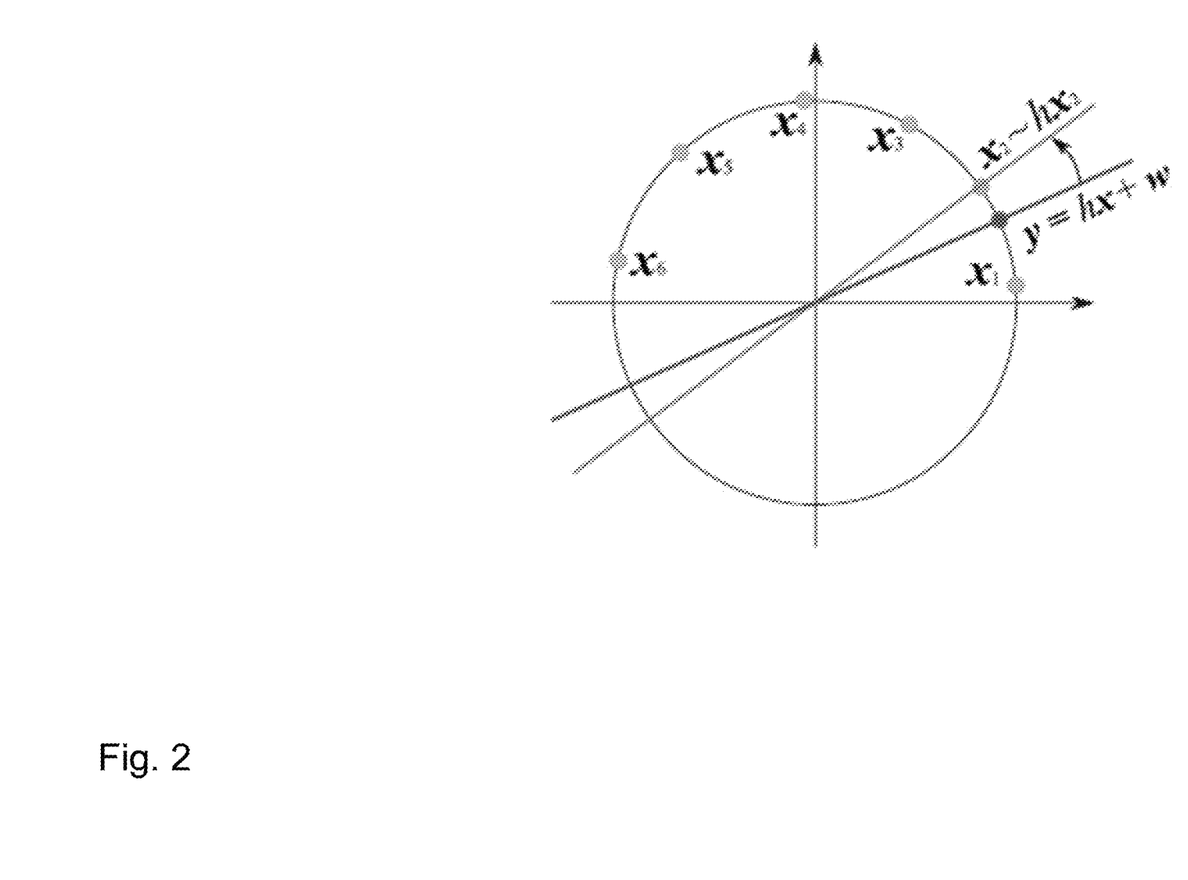
FIG. 2 shows a diagram for illustrating the basic idea of a Grassmannian manifold used for non-coherent communication.

The complex Grassmannian space can be thought of as the complex unit sphere of T dimensions. For the sake of visualization, FIG. 2 illustrates a simpler scenario consisting in the real unit sphere in a 2-dimensional space, which boils down to a circle. As will be appreciated, a good constellation is a constellation where the points, i.e. symbols forming the constellation (denoted as $x_1, \ldots, x_6$ in FIG. 2), are chosen such as to maximize their minimum pairwise distance, wherein the distance is measured on the Grassmannian space, i.e., on the circle. In the general case of a Grassmannian manifold, this corresponds to the chordal distance. This minimum pairwise distance maximization criterion leads to a constellation which is evenly spread in the Grassmannian space and is less susceptible to noise.

As will be described in more detail further below, the modulation constellation used by the transmitter 101a for generating the modulation symbol x on the basis of the sequence of data bits to be transmitted to the receiver 103 is defined by a tiling of a manifold, for example a Grassmannian manifold, into a plurality of cells and a Cartesian product of a plurality of auxiliary constellations, wherein the Cartesian product of the plurality of auxiliary constellations is mapped onto each cell of the plurality of cells and wherein each auxiliary constellation defines a plurality of auxiliary symbols.

Thus, in embodiments of the disclosure a modulation constellation based on a Grassmannian space or manifold is used by the transmitter for mapping a sequence of data bits to be transmitted to the receiver 103 into the modulation symbol x. For a modulation constellation based on a Grassmannian manifold, the modulation symbols thereof can be de-modulated or decoded by the receiver 103, i.e. turned again into the data bits without channel estimation. As will be appreciated, the "shape" of the constellation, i.e. the relative distribution and of all the possible modulation symbols in the Grassmannian manifold, determines the performance of the modulation, i.e. how many data bits can be represented by a single modulation symbol and how reliably these data bits can be recovered by the receiver 103.

Figure 3:
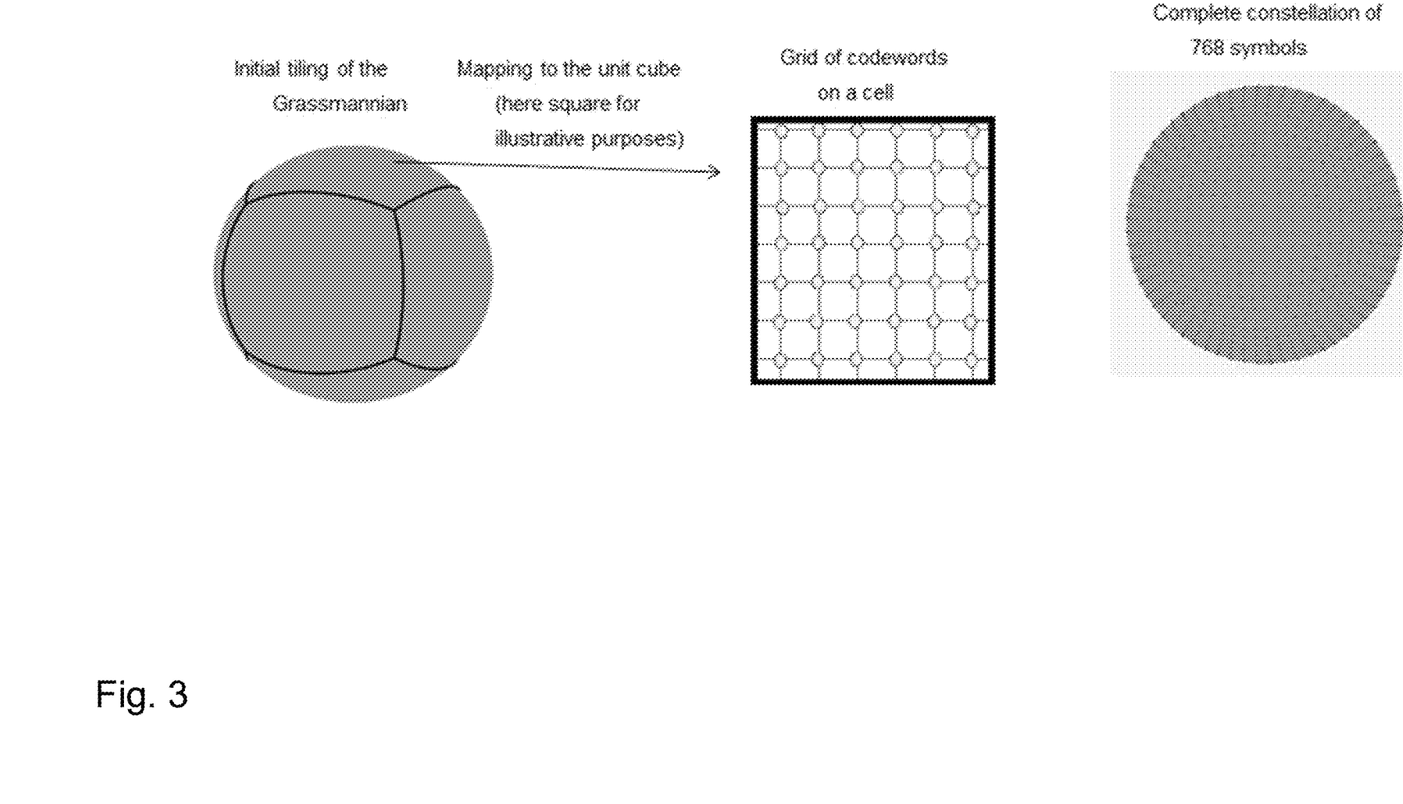
FIG. 3 shows a schematic diagram illustrating different aspects of a modulation constellation implemented in a transmitter according to an embodiment.

As illustrated by way of an example in FIG. 3, the main aspects of generating a modulation constellation employed by a transmitter 101a and a corresponding receiver 103 according to an embodiment can be described as: (i) splitting a manifold, e.g., Grassmannian manifold, into a plurality of cells/tiles; (ii) mapping a Cartesian product of auxiliary constellations (which can have a relatively simple structure) onto each cell/tile; and (iii) choosing the mapping to ensure that the modulation symbols forming the modulation constellation are uniformly spread over the Grassmannian space. Aspects (i) and (ii) reduce the complexity of the transmitter 101a and a corresponding receiver 103 according to an embodiment, while aspect (iii) improves the performance with respect to noise susceptibility.

In the following, embodiments of the transmitter (i.e. the encoder) 101a will be described in more detail, which is configured to transform a sequence of data bits into a modulation symbol x of size T. As already described above, embodiments of the disclosure are based on the following concepts: an initial tiling/partitioning of a Grassmannian manifold into T cells; and a constellation formed by taking the Cartesian product of 2(T−1) auxiliary constellations, for example, scalar Pulse Amplitude Modulation (PAM)-constellations (forming a grid in the 2(T−1)-dimensional space) is mapped onto each cell of this tiling. According to embodiments of the disclosure, the mapping is chosen such that the regularly spread symbols of the grid remain approximately evenly spread on each cell.

In an embodiment, each symbol of the modulation constellation can be assigned a binary label, which is a vector of B bits, in order to map a sequence of input bits into a sequence of symbols in the constellation to be transmitted via the channel. The input bit sequence can be taken from the binary representation of a message to be transmitted, or, if a channel error-correcting code is used, generated by a channel encoder.

Figure 4:
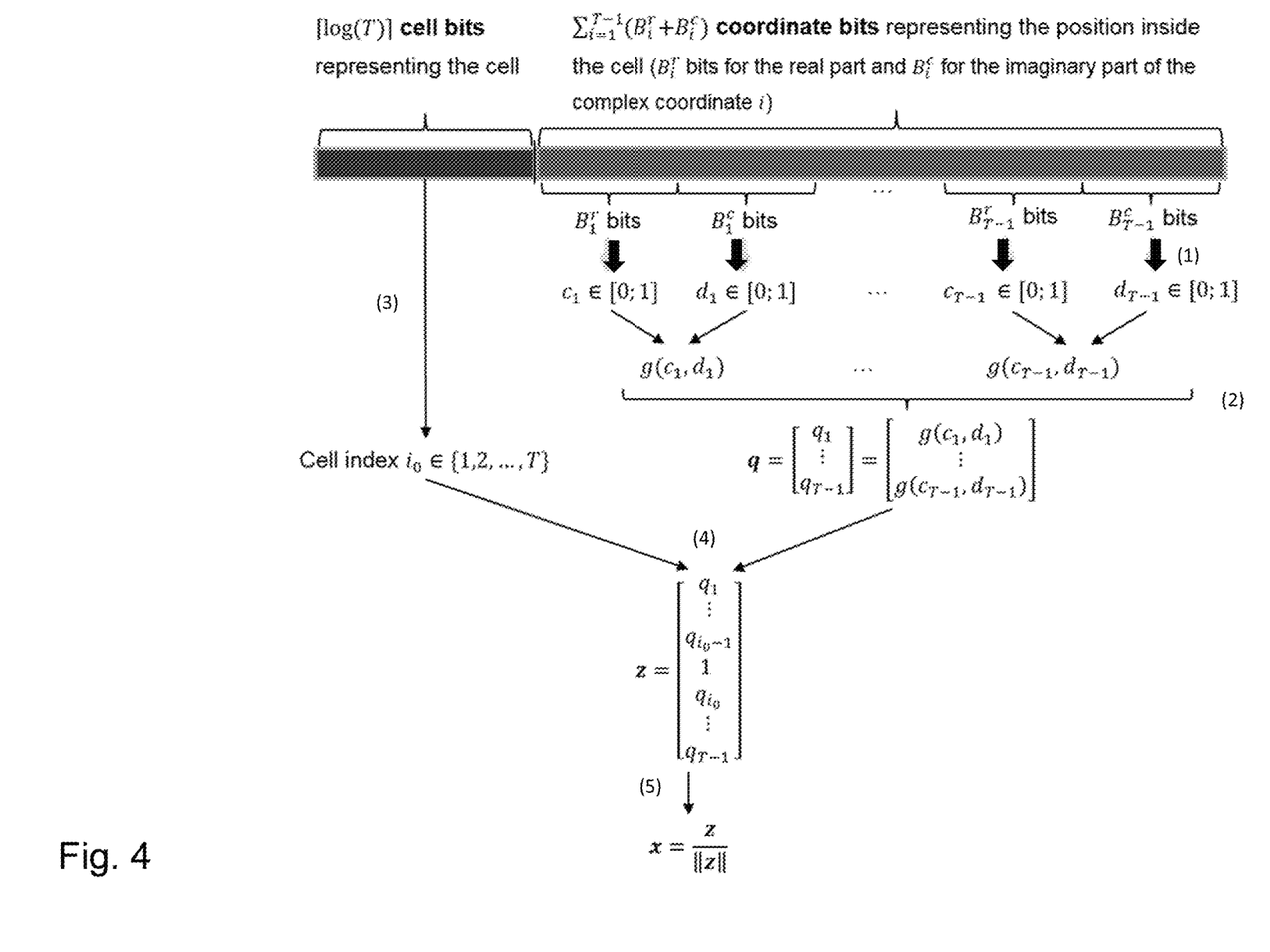
FIG. 4 shows a schematic diagram illustrating different aspects of a bit mapping used for a modulation constellation implemented in a transmitter according to an embodiment.

As illustrated in more detail in FIG. 4, the mapping maps each sequence of $[\log(T)] + \sum_{i=1}^{T-1}(B_i^r + B_i^c)$ input bits into a modulation symbol, wherein, as already mentioned above, the parameter T denotes the length or dimension of a modulation symbol (which also corresponds to the number of cells in the tiling of the Grassmannian manifold), and $B_i^r$ and $B_i^c$ are the number of bits corresponding respectively to the real part and imaginary part of the complex coordinate i of the modulation symbol. In an embodiment, the mapping g(.,.) illustrated in FIG. 4 can be defined as $$g(c,d) = \sqrt{\frac{1 - \exp\left(-\frac{|w|^2}{2}\right)}{1 + \exp\left(-\frac{|w|^2}{2}\right)}} \frac{w}{|w|},$$

with $w = N^{-1}(c) + iN^{-1}(d)$ and $N(.)$ is the cumulative distribution function of the standard Gaussian.

To illustrate this mapping, i.e. the generation of a modulation symbol x employed by the transmitter 101a according to embodiments of the disclosure, an illustrative example will be described in the following with an exemplary input bit sequence '10110001' and T=4, $B_1 = B_2 = \ldots = B_{2(T-1)} \triangleq B_0 = 1$. As already described above and illustrated in FIG. 4, the input bit sequence is divided into two parts, namely the cell bits comprising the first 2 bits of the input bit sequence, i.e. '10', and the coordinate bits comprising the remaining 6 bits of the input bit sequence, i.e. '110001'.

In a first stage (illustrated as (1) in FIG. 4) with $B_0 = 1$, an auxiliary constellation in the form of a pulse amplitude modulation (PAM) constellation of size $2^{B_0} = 2$ is defined in the interval [0,1], e.g., the PAM constellation {0.25; 0.75}. Applying this PAM constellation, to the coordinate bits '1', '1', '0', '0', '0', and '1' of the input bit sequence, the following real numbers $c_1 = 0.75$, $d_1 = 0.75$, $c_2 = 0.25$, $d_2 = 0.25$, $c_3 = 0.25$, and $d_3 = 0.75$ can be associated with (i.e. mapped to) the coordinate bits, respectively.

As will be described in more detail further below, in a second stage (illustrated as (2) in FIG. 4) a 3-dimensional complex vector q is generated on the basis of $c_1$, $d_1$, $c_2$, $d_2$, $c_3$ and $d_3$ as:

$$q = \begin{bmatrix} q_1 \\ q_2 \\ q_3 \end{bmatrix} = \begin{bmatrix} g(c_1, d_1) \\ g(c_2, d_2) \\ g(c_3, d_3) \end{bmatrix} = \begin{bmatrix} 0.3344 + 0.3344i \\ -0.3344 - 0.3344i \\ -0.3344 + 0.3344i \end{bmatrix}.$$

In a third stage (illustrated as (3) in FIG. 4), the cell bits '10' of the input bit sequence are converted into the integer $i_0 = 3$, representing the cell index.

In a fourth stage (illustrated as (4) in FIG. 4), a complex vector z of dimension 4 is generated on the basis of the cell index $i_0$ and the vector q as:

$$z = \begin{bmatrix} q_1 \\ q_2 \\ 1 \\ q_3 \end{bmatrix} = \begin{bmatrix} 0.3344 + 0.3344i \\ -0.3344 - 0.3344i \\ 1 \\ -0.3344 + 0.3344i \end{bmatrix}.$$

In a final fifth stage (illustrated as (5) in FIG. 4), the complex vector z is normalized for generating the modulation symbol x to be sent by the transmitter communication apparatus:

$$x = \frac{z}{\|z\|} = \begin{bmatrix} 0.2587 + 0.2587i \\ -0.2587 - 0.2587i \\ 0.7736 \\ -0.2587 + 0.2587i \end{bmatrix}.$$

In the following, more details about and further embodiments of the receiver 103 will be described. If a channel code has been used to generate the bit sequence, soft information of the bits for a message-passing channel decoder is necessary. Otherwise, a hard decision has to be made whether a transmitted bit was 0 or 1. Therefore, two types of decoders can be distinguished, namely hard decoders and soft decoders. The aim of a hard decoder is to retrieve the original bit sequence from the received matrix Y. The aim of soft decoder is to compute the log-likelihood ratio (LLR) for each bit position from the received matrix Y and give all computed LLRs as an input of a channel decoder. According to embodiments of the disclosure, the receiver 103 can comprise a hard decoder and/or a soft decoder, as will be described in more detail in the following.

According to an embodiment, the receiver 103 can comprise a hard decoder implemented as a maximum likelihood decoder configured to find the modulation symbol x in the constellation maximizing the likelihood expressed as:

$$\|Y^H x\|^2.$$

To this end, according to an embodiment, the receiver 103 can be configured to perform an exhaustive search over the whole modulation constellation.

According to a further embodiment, which is computationally less complex than the exhaustive search of the previous embodiment, the receiver 103 comprises a hard decoder implemented to perform the following operations:
(i) Compute the largest singular vector $u = (u_1, \ldots, u_T)$ of Y, i.e., a vector u such that $\|u\|^2 = 1$ maximizing $\|Y^H u\|^2$;
(ii) Decide the cell index i such that $|u_i| \geq |u_j|$ for any j;
(iii) Determine all coordinates independently according to ratios $u_j / u_i$ using the reverse mapping with respect to the transmitter 101a. More specifically, the reverse mapping can be defined by the following equation:

$$\begin{bmatrix} \hat{c}_1 \\ \hat{d}_1 \\ \vdots \\ \hat{d}_{i-1} \\ \hat{c}_i \\ \vdots \\ \hat{c}_{T-1} \\ \hat{d}_{T-1} \end{bmatrix} = \begin{bmatrix} N\left(\text{Re}\left(\sqrt{2}\log\left(\frac{1+|u_1/u_i|^2}{1-|u_1/u_i|^2}\right)^{1/2} \frac{u_1/u_i}{|u_1/u_i|}\right)\right) \\ N\left(\text{Im}\left(\sqrt{2}\log\left(\frac{1+|u_1/u_i|^2}{1-|u_1/u_i|^2}\right)^{1/2} \frac{u_1/u_i}{|u_1/u_i|}\right)\right) \\ \vdots \\ N\left(\text{Im}\left(\sqrt{2}\log\left(\frac{1+|u_{i-1}/u_i|^2}{1-|u_{i-1}/u_i|^2}\right)^{1/2} \frac{u_{i-1}/u_i}{|u_{i-1}/u_i|}\right)\right) \\ N\left(\text{Re}\left(\sqrt{2}\log\left(\frac{1+|u_{i+1}/u_i|^2}{1-|u_{i+1}/u_i|^2}\right)^{1/2} \frac{u_{i+1}/u_i}{|u_{i+1}/u_i|}\right)\right) \\ \vdots \\ N\left(\text{Re}\left(\sqrt{2}\log\left(\frac{1+|u_T/u_i|^2}{1-|u_T/u_i|^2}\right)^{1/2} \frac{u_T/u_i}{|u_T/u_i|}\right)\right) \\ N\left(\text{Im}\left(\sqrt{2}\log\left(\frac{1+|u_T/u_i|^2}{1-|u_T/u_i|^2}\right)^{1/2} \frac{u_T/u_i}{|u_T/u_i|}\right)\right) \end{bmatrix},$$

with N( ) denoting the cumulative distribution function of the standard Gaussian distribution;

(iv) For each $\hat{c}_j$, $\hat{d}_j$, determine the closest symbol within the auxiliary constellations;

(v) Determine respective coordinate bits corresponding to the respective closest symbol within the auxiliary constellations; and (vi) Determine the cell bits corresponding to the binary representation of index i.

According to a further embodiment, the receiver 103 implements a soft decoder configured to compute a log-likelihood ratio (LLR) for each bit position:

$$LLR_i(Y) = \log\frac{Pr(b_i = 1 | Y)}{Pr(b_i = 0 | Y)} = \log\frac{\sum_{x \in C_{i,1}} \exp\left(\frac{snr \cdot T}{1 + snr \cdot T}\|Y^H x\|^2\right)}{\sum_{x \in C_{i,0}} \exp\left(\frac{snr \cdot T}{1 + snr \cdot T}\|Y^H x\|^2\right)},$$

wherein snr denotes the signal-to-noise ratio equal to $$\frac{P\sigma_h^2}{\sigma_W^2}$$

where $\sigma_h^2$ and $\sigma_W^2$ respectively denote the average variance of the components of h and W; $C_{i,0}$ and $C_{i,1}$ denote the set of symbols of the constellation whose bit at position i in the binary label is equal to 0 and 1 respectively.

In a further embodiment, which is computationally less complex than the previous soft decoder embodiment, the receiver 103 is configured to use an approximation for the respective LLR in the following form:

$$LLR_i(Y) \approx \frac{snr \cdot T}{1 + snr \cdot T}\left(\max_{x \in R_{i,1}(x^*)}\|Y^H x\|^2 - \max_{x \in R_{i,1}(x^*)}\|Y^H x\|^2\right),$$

wherein x* denotes the symbol of the matrix Y determined by the hard decoder, $R_{i,0}(x)$ and $R_{i,1}(x)$ denote respective sets of the plurality of modulation symbols of the modulation constellation, whose respective bit at position i in the second portion of the sequence of data bits is equal to 0 and 1, respectively. In an embodiment, $R_{i,0}(x)$ and $R_{i,1}(x)$ denote respective sets of the plurality of modulation symbols of the modulation constellation, which are located in the vicinity of, for example closest to the modulation symbol x, and whose respective bit at position i in the second portion of the sequence of data bits is equal to 0 and 1, respectively.

According to an embodiment, the low-complexity LLR computation functions implemented in the receiver 103 can function as follows: (i) prior to communication, the receiver 103 computes and stores $R_{i,0}(x)$ and $R_{i,1}(x)$ for all the symbols x in the constellation; and (ii) upon receiving Y, the receiver 103 computes the LLR on the basis of the above approximation.

The embodiments of the communication scheme discussed so far are adapted, for example, for a block-fading channel of coherence interval T, whereby the channel gain h can be assumed to fade independently from one symbol to the next. However, the fading encountered in realistic channels might be slow enough to ensure that the channel gain h does not change significantly between two successive symbols. In that case, in order to improve the spectral efficiency, further embodiments of the disclosure extend the modulation constellation presented above and thus both the transmitter 101a and the receiver 103. Based on the fact that a modulation symbol in the Grassmannian constellation is invariant to scaling with a scalar, further embodiments are based on the ideas to encode more information and/or shorten the transmission time, as will be described in more detail below.

Figure 5:
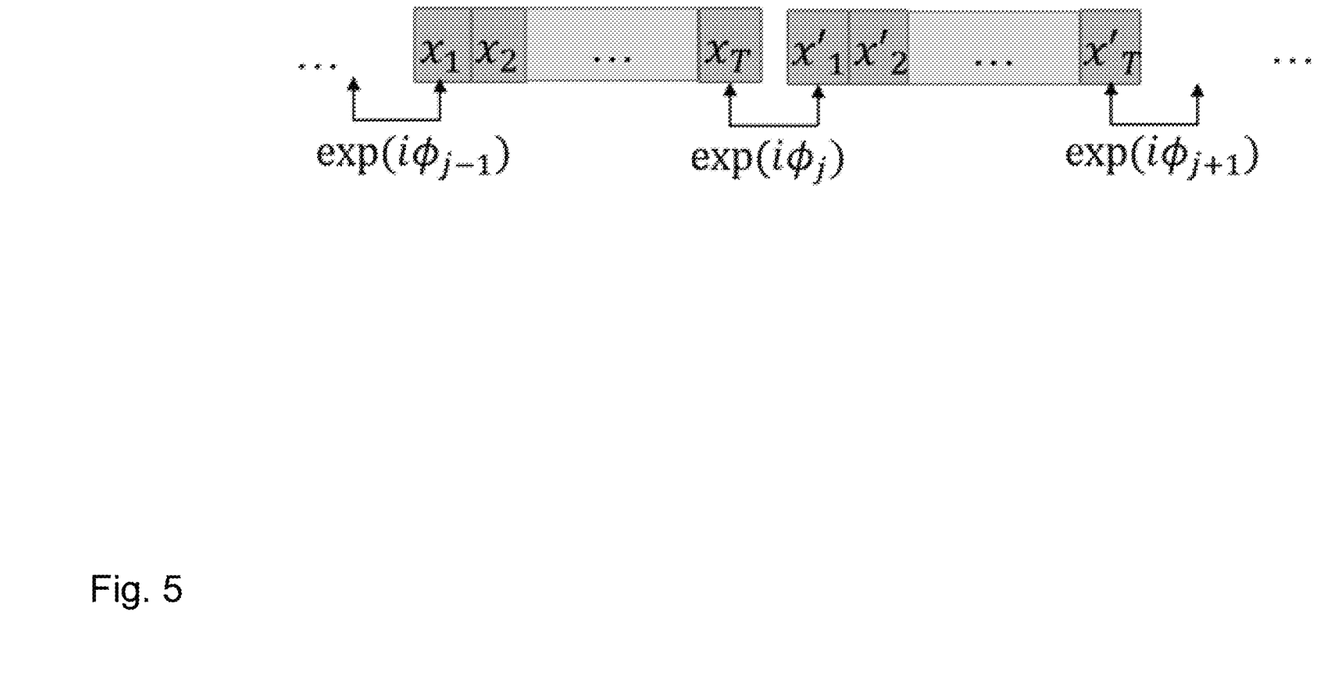
FIG. 5 shows a schematic diagram illustrating an augmented modulation scheme implemented in a transmitter according to an embodiment.

According to an embodiment, the receiver 101a is configured to encode additional information within a complex scalar $s=e^{i\varphi}$ which describes the phase relationship between two successive T-dimensional symbol vectors $x=(x_1, \ldots, x_T)$ and $x'=(x'_1, \ldots, x'_T)$ as illustrated in FIG. 5. More specifically, the receiver 101a can be configured to map to successive modulation symbols x and x' such that the following relation holds:

$$\frac{x_T}{|x_T|} = s\frac{x'_1}{|x'_1|}$$

The complex scalar s can be drawn from a phase-shift keying (PSK) constellation, for example the set of complex symbols $e^{i\varphi_1}, \ldots, e^{i\varphi_J}$ with phases $\varphi_1, \ldots, \varphi_J$ defined by j constellation points of a uniform grid in the interval $[0,2\pi]$. Either a systematic labelling or a Gray labelling can be used for the complex scalar s.

With respect to the receiver 103, the decoding of the additional information in the complex scalar s can be done based on the phase relationship of successively received signal matrices. Let $$Y = \sqrt{P}xh^H + W = \begin{bmatrix} y_1 \\ \vdots \\ y_M \end{bmatrix} \text{ and } Y' = \sqrt{P}x'h'^H + W' = \begin{bmatrix} y'_1 \\ \vdots \\ y'_M \end{bmatrix}$$

be the received signals corresponding to two consecutively transmitted symbols x and x'. The vectors $y_i=(y_{i,1}, \ldots, y_{i,T})$ and $y'_i=(y'_{i,1}, \ldots, y'_{i,T})$, $i=1, \ldots, M$, are the received signals at antenna i of the receiver 103 during T time slots. To decode s, the receiver 103 first can compute M guesses $$\hat{s}_i = \frac{y_{i,T}/|y_{i,T}|}{y'_{i,1}/|y'_{i,1}|}, i = 1, \ldots, M.$$

The receiver 103 then can estimate s by taking the average of $\hat{s}_1, \ldots, \hat{s}_M$, or taking the element among them with highest likelihood. Note that channel coding can also be used for the bit sequence carried in s.

According to a variant of the above embodiment, the transmitter 101a can be configured to map to successive modulation symbols x and x' such that the following relation holds:

$$\frac{x_a}{|x_a|} = s\frac{x'_b}{|x'_b|},$$

where $a = \arg\max_{a=1,\ldots,T}|x_a|$ and $b = \arg\max_{b=1,\ldots,T}|x'_b|$.

In the corresponding variant of the receiver 103, the guesses can be computed as:

$$\hat{s}_i = \frac{y_{i,\hat{a}}/|y_{i,\hat{a}}|}{y'_{i,\hat{b}}/|y'_{i,\hat{b}}|}, i=1,\ldots,M,$$

where $\hat{a} = \arg\max_{a=1,\ldots,T}|y_{i,a}|$ and $\hat{b} = \arg\max_{b=1,\ldots,T}|y'_{i,b}|$.

Figure 6:
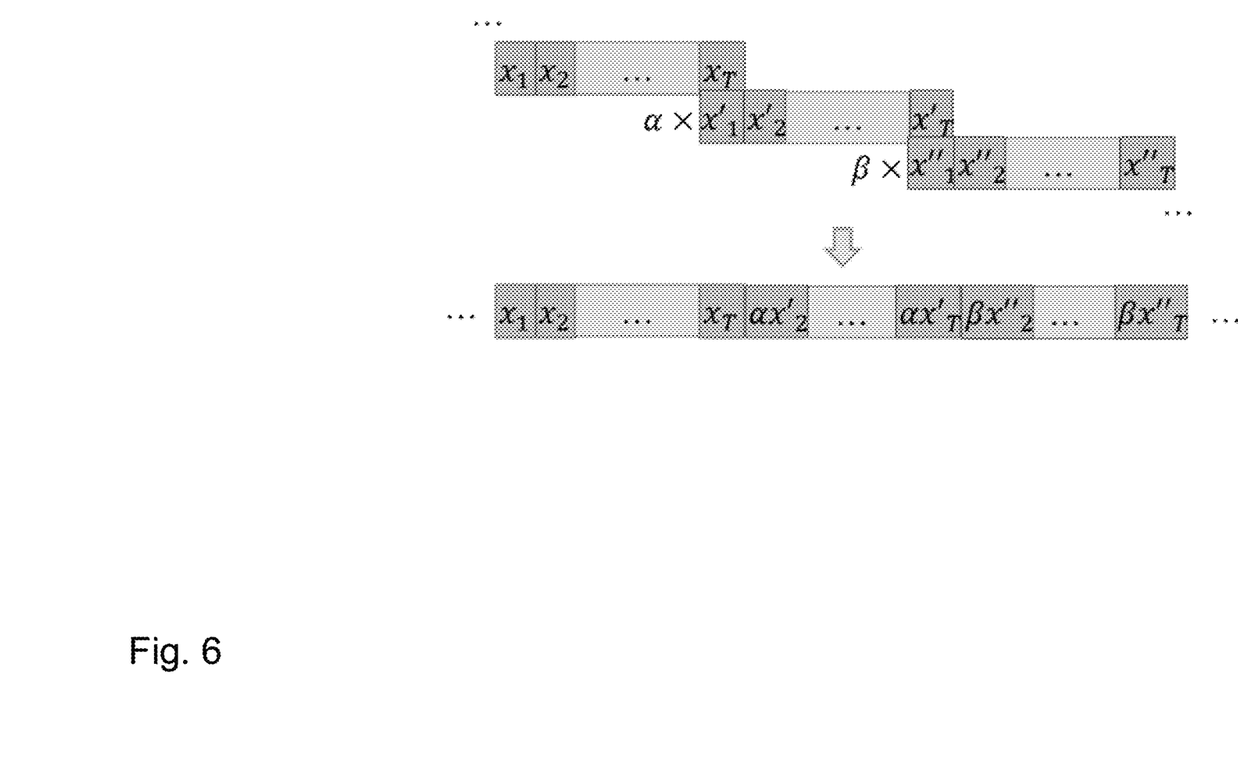
FIG. 6 shows a schematic diagram illustrating overlapping symbols transmitted by a transmitter according to an embodiment.

According to an embodiment, the receiver 101a is configured to shorten the transmission time by scaling and overlapping sequentially transmitted symbols x and x', as illustrated in FIG. 6. In an embodiment, the transmitter 101a is configured to scale the latter symbol x' by a factor α such that $\alpha x_1' = x_T$, that is, $$\alpha = \frac{x_T}{x_1'}.$$

Moreover, the transmitter 101a is configured to transmit the (2T−1)-dimensional vector $(x_1,\ldots,x_T,\alpha x_2',\ldots,\alpha x_T')$ to the receiver 103 instead of transmitting x and x' successively. This procedure can be repeated for the next transmitted symbols and so on. In this way, the symbol sequence is squeezed such that N consecutive symbols are sent in NT−(N−1) time slots instead of NT time slots as before, thus saving N−1 time slots. The case N=3 is illustrated in FIG. 6.

With respect to the receiver 103, a sequence of M-dimensional received signal vectors $y_1,\ldots,y_n$ in n succesive time slots, n>T, can be considered. Each vector contains the received signal across M antennas in one time slot. The receiver 103 can first expand this sequence by duplicating the vectors $y_{T+i(T-1)}$ for i=0, 1, 2, . . . , then decode each group of T vectors (which is a M×T matrix) sequentially as in the case of the block-fading channel.

Figure 7:
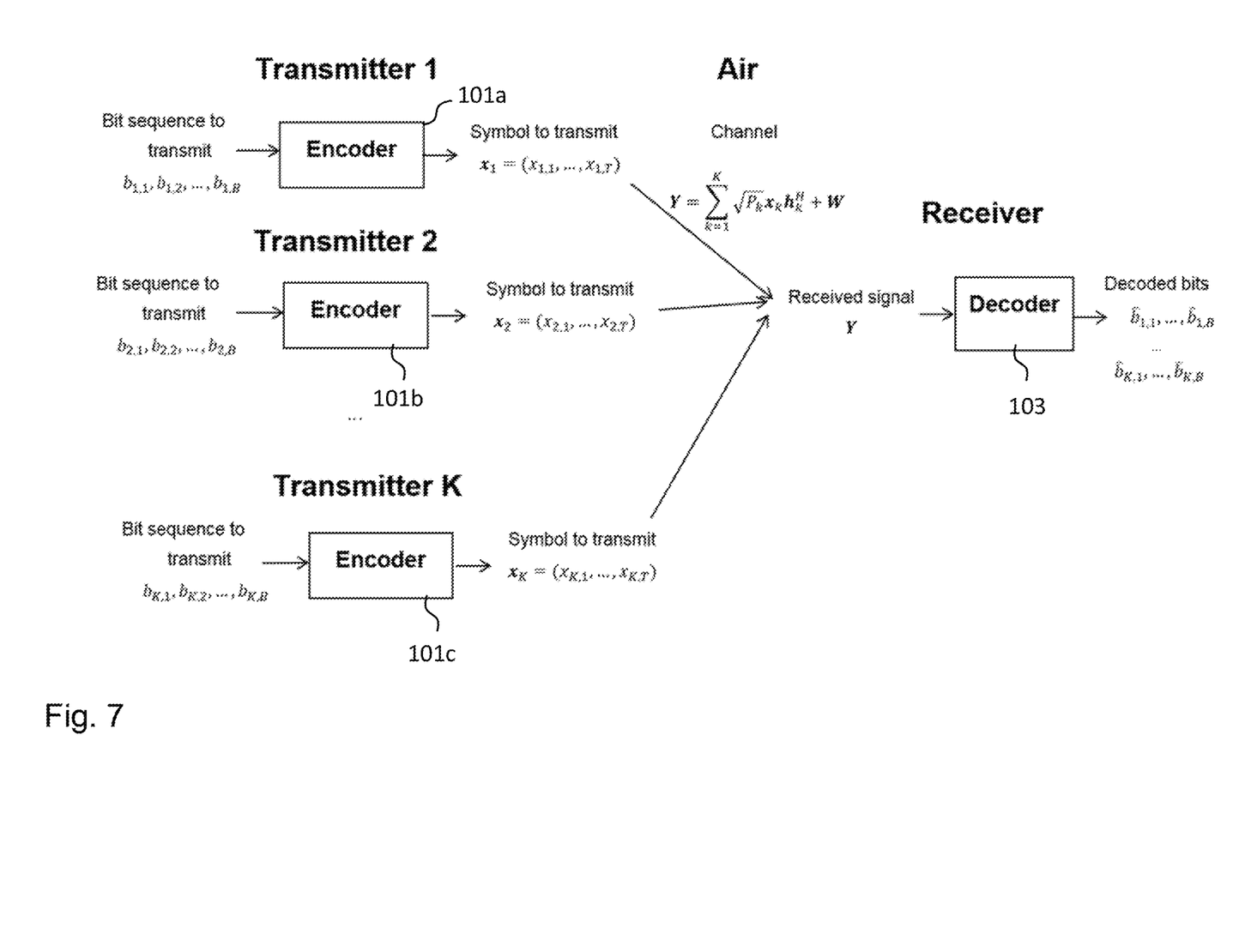
FIG. 7 shows a schematic diagram illustrating a non-coherent communication system comprising a plurality of transmitters and a receiver according to an embodiment.

The embodiments of the communication system 100 described above are mainly concerned with the transmitter 101a being a single transmitter. Further embodiment, however, relate to the case, where the transmitter 101a is one of a group of transmitters 101a-c, as illustrated in FIG. 7. As will be appreciated, in these embodiments, the receiver 103 receives the sum of transmitter contributions, as illustrated in FIG. 7. The received signal can be described as the sum of the contributions of K transmitters, e.g., 101a-c $$Y = \sum_{k=1}^{K} \sqrt{P_k} x_k h_k^H + W,$$

wherein Y is the T×M matrix of received signals for the M antennas of the receiver, W is a matrix of size T×M and representing the thermal noise, $\sqrt{P_k}$ is the power gain of transmitter k, $x_k$ is a vector of size T representing the symbol sent by a transmitter k, and $h_k$ is a vector of size M representing the channel between the antenna of transmitter k and the M antennas of the receiver 103.

The symbol sent by the transmitter k can be further described as $$x_k = f_k(\tilde{x}_k),$$

Where $\tilde{x}_k$ is a vector of size T−K+1 chosen amongst the modulation constellation $C_k$ described in the single-transmitter case wherein the vector size is replaced by T−K+1 and $f_k$ is a precoder mapping specific to the transmitter k. According to embodiments of the disclosure for $\tilde{x}_1,\ldots,\tilde{x}_K$, the respective constellations $C_k,\ldots,C_K$ can be identical or different. After the precoder mapping, each user k has an individual constellation for $x_k$.

According to an embodiment, the precoder mapping $f_k$ can be a linear precoding followed by a normalization, i.e.

$$f_k(\tilde{x}_k) = \frac{U_k \tilde{x}_k}{\|U_k \tilde{x}_k\|},$$

where $U_k$ is a matrix of size T×(T−K+1).

In the following, some possible implementations for the precoding matrix $U_k$ according to embodiments of the disclosure will be described, wherein $e_k$ denotes the vector of size T with 1 at position k and 0 elsewhere.

Type I precoders: $U_1 = (e_1, e_{K+1},\ldots,e_T),\ldots,U_k = (e_k, e_{K+1},\ldots,e_T),\ldots,U_K = (e_K, e_{K+1},\ldots,e_T)$.

Type I precoders with power allocation:

$$U_1 = (\sqrt{Q_1}\, e_1, \sqrt{Q_2}\, e_{K+1},\ldots,\sqrt{Q_2}\, e_T),\ldots,$$

$$U_k = (\sqrt{Q_1}\, e_k, \sqrt{Q_2}\, e_{K+1},\ldots,\sqrt{Q_2}\, e_T),\ldots,$$

$$U_K = (\sqrt{Q_1}\, e_K, \sqrt{Q_2}\, e_{K+1},\ldots,\sqrt{Q_2}\, e_T) \text{ with } Q_1 =$$

$$K\frac{T-K+1}{T} \text{ and } Q_2 = \frac{T-K+1}{T}.$$

Type II precoders: $U_k = (e_1,\ldots,e_{(k-1)(K-1)}, e_{k(K-1)+1},\ldots,e_T)$ for any k=1, . . . ,K.

For any of the above precoding matrices, the transmitter 101a-c can use either the precoding matrix $U_k$ or a rotated version thereof, i.e.

$$U_k = R U'_k,$$

where $U'_k$ denotes any one of the precoding matrices mentioned above and R is a T×T rotation matrix (independent of k), i.e., a matrix such that $R^H R = I_T$.

In the multiple-transmitter case illustrated in FIG. 7, the receiver 103 can be configured to perform the following two operations:

(i) A first operation of transmitter separation that provides an estimate $\tilde{\tilde{x}}_k$ of $\tilde{x}_k$ in the Grassmannian of lines of dimension T−K+1 from the observed matrix Y and uses the information on the precoders shared to both transmitters 101a-c and receiver 103.

(ii) A second operation of transmitter decoding (either in the hard or soft manner) using the same operations as in the single-transmitter case using $\tilde{\tilde{x}}_k$ as input (instead of Y).

In the following different embodiments for the first operation will be described in more detail (the second operation being similar to the single-transmitter case).

According to an embodiment (referred to as separation type I), the receiver 103 can be configured to directly separate the transmitters 101a-c by finding a M×(M−K+1) matrix $A_k$ such that $A_k^H A_k = I_M$ and $V_k^H Y A_k = 0$ where $V_k$ is the T×(K−1) projector onto the subspace orthogonal to the subspace spanned by the columns of $U_k$, i.e. such that $V_k^H U_k = 0$. The matrix $A_k$ spans the nullspace of $V_k^H Y$ and can be constructed from the vectors orthogonal to the singular vectors of $V_k^H Y$ whose corresponding singular values are non-zero. Note that $A_k$ serves as an estimation of the basis of the subspace orthogonal to $[h_1^*,\ldots,h_{k-1}^*, h_{k+1}^*,\ldots,h_K^*]$. After that, $$\tilde{\tilde{x}}_k = (U_k^H U_k)^{-1} U_k^H Y A_k$$

can be considered as the input of the receiver 103 according to one of the embodiments for the single-transmitter case described above.

According to a further embodiment (referred to as separation type II), the receiver 103 can be configured to solve the equation:

$$\hat{X} = \arg\max_{X \in \mathbb{C}^{T \times K}; X^H X = I} \|Y^H X\|.$$

The solution of this optimization is known to be $\hat{X}$, i.e. the collection of the K singular vectors of Y associated to the K strongest singular values. After that, the receiver 103 can find the unique $\tilde{\hat{x}}_1, \ldots, \tilde{\hat{x}}_K$ such that $\hat{X} = \text{span}(U_1 \tilde{\hat{x}}_1, \ldots, U_K \tilde{\hat{x}}_K)$, seeing that each $U_k \tilde{\hat{x}}_k$ is in the subspace spanned by the precoding matrix $U_k$. In order to do so, the receiver 103 can be configured to apply the separation operation described for the previous embodiment (separation type I) to $\hat{X}$. That is, the receiver 103 first finds a M×(M−K+1) matrix $A_k$ such that $A_k^H A_k = I_M$ and $V_k^H \hat{X} A_k = 0$, and then $$\tilde{\hat{x}}_k = (U_k^H U_k)^{-1} U_k^H \hat{X} A_k$$

can be considered as the input of the receiver 103 according to one of the embodiments for the single-transmitter case described above.

According to a further embodiment (referred to as separation type III), the receiver 103 can be configured to compute $\hat{X}$ as in the separation type II embodiment and compute $(\tilde{\hat{x}}_1, \ldots, \tilde{\hat{x}}_K)$, $\tilde{\hat{x}}_k \in C_k$, such that the matrix $[U_1 \tilde{\hat{x}}_1 \ldots U_K \tilde{\hat{x}}_K]$ is closest to $\hat{X}$ in the Grassmannian space, i.e., $$[\tilde{\hat{x}}_1 \ldots \tilde{\hat{x}}_K] = \arg\max_{\tilde{\hat{x}}_k \in C_k, k=1,\ldots,K} \|\hat{X}^H X\| \text{ with } X = [U_1 \tilde{\hat{x}}_1 \ldots U_K \tilde{\hat{x}}_K].$$

This can be done by an exhaustive search on the product space of all constellations $C_k$. After that, $\tilde{\hat{x}}_k$ can be considered as the input of the receiver 103 according to one of the embodiments for the single-transmitter case described above (note that the hard decoder output will therefore simply be $\tilde{\hat{x}}_k$).

Figure 8:
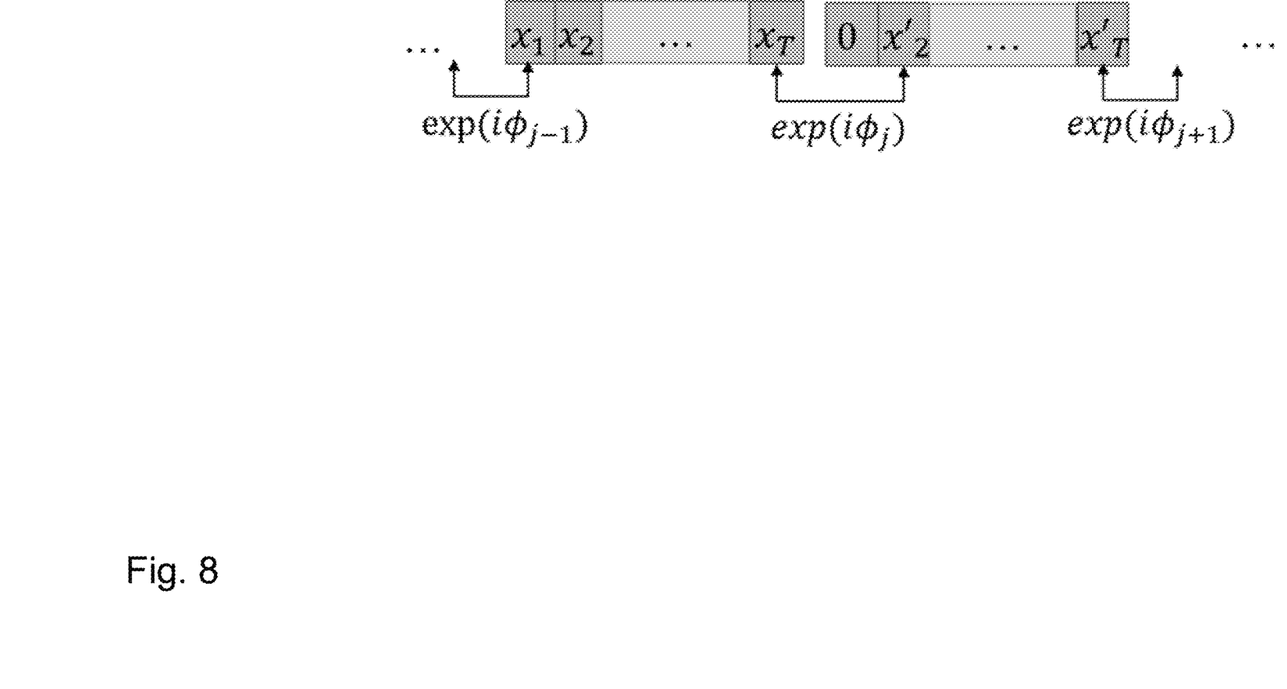
FIG. 8 shows a schematic diagram illustrating a further augmented modulation scheme implemented in a transmitter according to an embodiment.

As in the single-transmitter case, according to embodiments of the disclosure, the multiple-transmitter constellations can be extended in order to improve the performance of the constellation for realistic channels using two approaches, namely encoding more information and/or shortening the transmission time. According to an embodiment, additional information can be encoded between two T-dimensional symbols for each transmitter among the transmitters 101a-c. As can be taken from FIG. 8, the principle is the same as for the single-transmitter embodiments described above, i.e., embedding an additional complex scalar in the phase difference between the last non-zero element of $x_k$ and the first non-zero element of a new symbol of the transmitter k, $x_k'$ (since precoders can have zero values, one has to take this into account).

Embodiments of the disclosure provide, for example, the following advantages: the structured modulation constellation according to embodiments of the disclosure allows a low-complexity encoder and decoder processing; the modulation constellation preserves good min-distance properties; the modulation constellation is available for large dimensions; the modulation constellation is well adapted for the 3GPP channel; the modulation constellation can handle the case of multiple transmitters.

While a particular feature or aspect of the disclosure may have been disclosed with respect to only one of several implementations or embodiments, such a feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those of ordinary skill in the art readily recognize that there are numerous applications of the disclosure beyond those described herein. While the present disclosure has been described with reference to one or more particular embodiments, those of ordinary skill in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A transmitting communication apparatus for communicating with a receiving communication apparatus via a communication channel, comprising:
   at least one processor; and
   a non-transitory memory storing instructions, which when executed by the at least one processor, cause the transmitting communication apparatus to perform operations comprising:
   mapping a sequence of data bits into a modulation symbol of a plurality of modulation symbols defined by a modulation constellation, wherein the modulation constellation is defined by a tiling of a Grasmannian manifold into a plurality of cells and a Cartesian product of a plurality of auxiliary constellations, the Cartesian product of the plurality of auxiliary constellations is mapped onto each cell of the plurality of cells and each auxiliary constellation defines a plurality of auxiliary symbols; and
   transmitting a modulated signal based on the modulation symbol via the communication channel to the receiving communication apparatus.

2. The transmitting communication apparatus according to claim 1, wherein the plurality of auxiliary constellations comprise a plurality of real pulse amplitude modulation (PAM) constellations.

3. The transmitting communication apparatus according to claim 1, wherein the operations further comprise mapping the sequence of data bits into the modulation symbol by associating the modulation symbol with the sequence of data bits in that a first portion of the sequence of data bits identifies a respective cell of the plurality of cells in the tiling of the Gras smannian manifold and a second portion of the sequence of data bits identifies a position of the modulation symbol within the respective cell of the Grassmannian manifold.

4. The transmitting communication apparatus according to claim 3, wherein the second portion of the sequence of data bits identifies the position of the modulation symbol within the respective cell based on a respective Gray-code labeling of the respective plurality of auxiliary symbols of a respective cell in the tiling of the Gras smannian manifold.

5. The transmitting communication apparatus according to claim 4, wherein the operations further comprise converting the first portion of the sequence of data bits into an integer cell index $i_o$ in a range $[1, T]$ and generating the modulation symbol of the modulation constellation as a normalized complex vector x corresponding to a complex vector z, wherein the at least one processor is further configured to determine the complex vector z on a basis of the following equation:

$$z = \begin{bmatrix} g(c_1, d_1) \\ \vdots \\ g(c_{i_0-1}, d_{i_0-1}) \\ 1 \\ g(c_{i_0}, d_{i_0}) \\ \vdots \\ g(c_{T-1}, d_{T-1}) \end{bmatrix},$$

wherein T denotes a total number of cells in the tiling of the Grassmannian manifold, $c_i$, $c_i$ denote a respective auxiliary symbol of a respective auxiliary constellation given by a respective real number in a range $[0, 1]$ associated with the second portion of the sequence of data bits, and the function g(c,d) is configured to distribute the modulation symbols over the Grassmannian manifold in a substantially uniform manner.

6. The transmitting communication apparatus according to claim 5, wherein the function g(c,d) is defined by the following equation:

$$g(c, d) = \sqrt{\frac{1 - \exp\left(-\frac{|w|^2}{2}\right)}{1 + \exp\left(-\frac{|w|^2}{2}\right)}} \frac{w}{|w|},$$

with $w = N^{-1}(c) + iN^{-1}(d)$ and $N(\ )$ denoting a cumulative distribution function of a standard Gaussian distribution.

7. The transmitting communication apparatus according to claim 1, wherein the operations further comprise encoding additional information by mapping a further sequence of data bits into a further modulation symbol of the plurality of modulation symbols defined by the modulation constellation, and the additional information is encoded as a phase difference between a first component of the modulation symbol and a second component of the further modulation symbol.

8. The transmitting communication apparatus according to claim 7, wherein the operations further comprise mapping the further sequence of data bits into the further modulation symbol of the plurality of modulation symbols defined by the modulation constellation such that the following relation holds:

$$\frac{x_T}{|x_T|} = s \frac{x'_1}{|x'_1|}$$

wherein $x_T$ denotes a T-th component of the modulation symbol $x = (x_1, \ldots, x_T)$, $x'_1$ denotes a first component of the further modulation symbol $x' = (x'_1, \ldots, x'_T)$ and s denotes a complex scalar $s = e^{i\varphi}$ defining a phase relationship between the modulation symbol x and the further modulation symbol x'.

9. The transmitting communication apparatus according to claim 8, wherein the operations further comprise selecting the complex scalar s from a phase-shift keying (PSK) constellation.

10. The transmitting communication apparatus according to claim 8, wherein the operations further comprise selecting the complex scalar s from a set of complex symbols $e^{i\varphi_1}, \ldots, e^{i\varphi_J}$ with phases $\varphi_1, \ldots, \varphi_J$ defined by J constellation points of a uniform grid in interval $[0, 2\pi]$.

11. The transmitting communication apparatus according to claim 1, wherein the operations further comprise mapping a further sequence of data bits into a further modulation symbol of the plurality of modulation symbols defined by the modulation constellation and to generate the modulated signal on a basis of a (2T−1)-dimensional vector defined as follows:

$$(x_1, \ldots, x_T, \alpha x'_2, \ldots, \alpha x'_T),$$

wherein $x_1, \ldots, x_T$ denote T components of the modulation symbol $x = (x_1, \ldots, x_T), \ldots, x'_2, \ldots, x'_T$ denote (T−1) components of the modulation symbol $x' = (x'_1, \ldots, x'_T)$ and $\alpha$ denotes a scaling parameter defined as $$\alpha = \frac{x_T}{x'_1}.$$

12. The transmitting communication apparatus according to claim 1, wherein the transmitting communication apparatus is one of a group of transmitting communication apparatuses communicating with the receiving communication apparatus and the operations further comprise precoding and normalizing the modulation symbol to produce a pre-coded modulation symbol and generating the modulated signal on basis of the pre-coded modulation symbol such that the pre-coded modulation symbol is uniquely attributable to the transmitting communication apparatus.

13. The transmitting communication apparatus according to claim 12, wherein the operations further comprise precoding and normalizing the modulation symbol using a precoding matrix $U_k$ of size $T \times (T-K+1)$ as:

$$\frac{U_k x}{\|U_k x\|},$$

with x denoting the modulation symbol, k denoting a k-th transmitting communication apparatus of the group of transmitting communication apparatuses and K denoting a size of the group of transmitting communication apparatuses.

14. The transmitting communication apparatus according to claim 13, wherein the precoding matrix $U_k$ is defined by the following equation:

$$U_k=(e_k,e_{K+1},\ldots,e_T),$$

wherein $e_k$ denotes a vector of size T with 1 at position k and 0 elsewhere.

15. The transmitting communication apparatus according to claim 13, wherein the precoding matrix $U_k$ is defined by the following equation:

$$U_k=(\sqrt{Q_1}e_k,\sqrt{Q_2}e_{K+1},\ldots,\sqrt{Q_2}e_T),$$

wherein $e_k$ denotes a vector of size T with 1 at position k and 0 elsewhere, and wherein $$Q_1 = K\frac{T-K+1}{T} \text{ and } Q_2 = \frac{T-K+1}{T}.$$

16. The transmitter communication apparatus according to claim 13, wherein the precoding matrix $U_k$ is defined by the following equation:

$$U_k=(e_1,\ldots,e_{(k-1)(K-1)},e_{k(K-1)+1},\ldots,e_T),$$

wherein $e_k$ denotes a vector of size T with 1 at position k and 0 elsewhere.

17. A receiving communication apparatus for communicating with a transmitting communication apparatus via a communication channel, comprising:
at least one processor; and
a non-transitory memory storing instructions, which when executed by the at least one processor, cause the receiving communication apparatus to perform operations comprising:
receiving a modulated signal from the transmitting communication apparatus via the communication channel, wherein the modulated signal is generated based on a mapping of a sequence of to-be-transmitted data bits into a modulation symbol of a plurality of modulation symbols defined by a modulation constellation, wherein the modulation constellation is defined by a tiling of a Gras smannian manifold into a plurality of cells and a Cartesian product of a plurality of auxiliary constellations, the Cartesian product of the plurality of auxiliary constellations is mapped onto each cell of the plurality of cells and each auxiliary constellation defines a plurality of auxiliary symbols; and
generating, based on the received modulated signal, a sequence of data bits that is the same as the sequence of to-be-transmitted data bits.

18. The receiving communication apparatus according to claim 17, wherein the received modulated signal is represented by a matrix Y and the at least one processor comprises a hard decoder configured to generate the sequence of data bits by: determining a vector u defined by the matrix Y with $\|u\|^2=1$ maximizing $\|Y^H u\|^2$; determining an index i of a cell of the plurality of cells of the Gras smannian manifold such that $|u_i|\geq|u_j|$ for any j, wherein $u_i$ denotes the i-th component of the vector u; applying the mapping defined by the following equation:

$$\begin{bmatrix} \hat{c}_1 \\ \hat{d}_1 \\ \vdots \\ \hat{d}_{i-1} \\ \hat{c}_i \\ \vdots \\ \hat{c}_{T-1} \\ \hat{d}_{T-1} \end{bmatrix} = \begin{bmatrix} N\left(\text{Re}\left(\sqrt{2}\log\left(\frac{1+|u_1/u_i|^2}{1-|u_1/u_i|^2}\right)^{1/2}\frac{u_1/u_i}{|u_1/u_i|}\right)\right) \\ N\left(\text{Im}\left(\sqrt{2}\log\left(\frac{1+|u_1/u_i|^2}{1-|u_1/u_i|^2}\right)^{1/2}\frac{u_1/u_i}{|u_1/u_i|}\right)\right) \\ \vdots \\ N\left(\text{Im}\left(\sqrt{2}\log\left(\frac{1+|u_{i-1}/u_i|^2}{1-|u_{i-1}/u_i|^2}\right)^{1/2}\frac{u_{i-1}/u_i}{|u_{i-1}/u_i|}\right)\right) \\ N\left(\text{Re}\left(\sqrt{2}\log\left(\frac{1+|u_{i-1}/u_i|^2}{1-|u_{i-1}/u_i|^2}\right)^{1/2}\frac{u_{i-1}/u_i}{|u_{i-1}/u_i|}\right)\right) \\ \vdots \\ N\left(\text{Re}\left(\sqrt{2}\log\left(\frac{1+|u_T/u_i|^2}{1-|u_T/u_i|^2}\right)^{1/2}\frac{u_T/u_i}{|u_T/u_i|}\right)\right) \\ N\left(\text{Im}\left(\sqrt{2}\log\left(\frac{1+|u_T/u_i|^2}{1-|u_T/u_i|^2}\right)^{1/2}\frac{u_T/u_i}{|u_T/u_i|}\right)\right) \end{bmatrix},$$

with $N(\ )$ denoting a cumulative distribution function of a standard Gaussian distribution; for each $\hat{c}_i$, $\hat{d}_i$, determining a closest symbol within the auxiliary constellations; determining respective coordinate bits corresponding to the respective closest symbol within the auxiliary constellations; and determining cell bits corresponding to a binary representation of index i.

19. The receiving communication apparatus according to claim 18, wherein the operations further comprise generating the sequence of data bits on a basis of a plurality of log-likelihood ratios (LLRs), and the at least one processor is configured to determine the plurality of LLRs based on the following equation:

$$LLR_i(Y) \approx \frac{snr\cdot T}{1+snr\cdot T}\left(\max_{x\in R_{i,1}(x^*)}\|Y^H x\|^2 - \max_{x\in R_{i,0}(x^*)}\|Y^H x\|^2\right),$$

wherein snr denotes a signal-to-noise ratio equal to $$\frac{P\sigma_h^2}{\sigma_W^2}$$

where $\sigma_h^2$ and $\sigma_W^2$, respectively denote an average variance of components of h and W, T denotes a length of a respective modulation symbol, x* denotes the modulation symbol determined on a basis of the matrix Y by the hard decoder, $R_{i,0}(x)$ and $R_{i,1}(x)$ denote respective sets of the plurality of modulation symbols of the modulation constellation, whose respective bit at position i in a second portion of the sequence of data bits is equal to 0 and 1, respectively.

20. The receiving communication apparatus according to claim 19, wherein $R_{i,0}(x)$ and $R_{i,1}(x)$ denote respective sets of the plurality of modulation symbols of the modulation constellation, which are located in the vicinity of the modulation symbol x and whose respective bit at position i in the second portion of the sequence of data bits is equal to 0 and 1, respectively.

* * * * *

UNITED STATES PATENT AND TRADEMARK OFFICE
CERTIFICATE OF CORRECTION

PATENT NO. : 11,258,649 B2  
APPLICATION NO. : 17/243679  
DATED : February 22, 2022  
INVENTOR(S) : Hoang et al.

Page 1 of 1

It is certified that error appears in the above-identified patent and that said Letters Patent is hereby corrected as shown below:

In the Claims

Claim 1, Column 16, Line 58, replace "Gras smannian" with "Grassmannian";

Claim 3, Column 17, Line 11, replace "Gras smannian" with "Grassmannian";

Claim 4, Column 17, Line 20, replace "Gras smannian" with "Grassmannian";

Claim 5, Column 17, Line 43, replace "$c_i, c_i$" with "$c_i, d_i$";

Claim 12, Column 18, Line 56, replace "on basis" with "on a basis";

Claim 17, Column 19, Line 45, replace "Gras smannian" with "Grassmannian"; and

Claim 18, Column 19, Line 60, replace "Gras smannian" with "Grassmannian".

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*